(12) United States Patent
Baeck et al.

(10) Patent No.: US 9,043,693 B2
(45) Date of Patent: May 26, 2015

(54) INPUT TRAIL ON DATA ENTRY (75) Inventors: Christian Baeck, Wiesloch (DE); Peter Tillert, Bad Schoenborn (DE); Tahar El Idrissi-Lamghari, Walldorf (DE); Henrik Arndt, Frankfurt (DE); Jan Matthes, Darmstadt (DE)

(73) Assignee: SAP SE, Walldorf (DE)

( * ) Notice: Subject to any disclaimer, the term of this patent is extended or adjusted under 35 U.S.C. 154(b) by 666 days.

(21) Appl. No.: 13/338,985

(22) Filed: Dec. 28, 2011

(65) Prior Publication Data

US 2013/0174005 A1    Jul. 4, 2013

(51) Int. Cl.
*G06F 17/00*    (2006.01)
*G06F 17/24*    (2006.01)
*G06F 17/22*    (2006.01)

(52) U.S. Cl.
CPC .......... *G06F 17/246* (2013.01); *G06F 17/2288* (2013.01); *G06F 17/24* (2013.01)

(58) Field of Classification Search
CPC .... G06F 17/246; G06F 17/24; G06F 17/2288
USPC .......................... 715/212, 217, 220, 229, 225
See application file for complete search history.

(56) References Cited

U.S. PATENT DOCUMENTS

| 8,839,100 | B1* | 9/2014 | Orofino, II | 715/255 |
| 2006/0080594 | A1* | 4/2006 | Chavoustie et al. | 715/503 |
| 2007/0011211 | A1* | 1/2007 | Reeves et al. | 715/503 |
| 2009/0199081 | A1* | 8/2009 | Arida et al. | 715/211 |
| 2010/0251091 | A1* | 9/2010 | Jania | 715/219 |
| 2013/0055058 | A1* | 2/2013 | Leong et al. | 715/219 |
| 2014/0033009 | A1* | 1/2014 | Rein et al. | 715/212 |

* cited by examiner

*Primary Examiner* — Chau Nguyen
(74) *Attorney, Agent, or Firm* — Buckley, Maschoff & Talwalkar LLC (57) ABSTRACT

A system may include reception, from a planning application, of a spreadsheet including a plurality of values, presentation of the plurality of values, reception of a first instruction to change a first value of the plurality of values to a second value, presentation, in response to the instruction, of a visual indication in association with the second value, the visual indication indicating that the second value is a fixed value, reception of a second instruction to refresh the spreadsheet, and in response to the second instruction, determination of one or more of the plurality of values of the spreadsheet, each of the determined one or more of the plurality of values presented in association with a visual indication indicating that the value is a fixed value, and transmission of the determined one or more of the plurality of values and a request to refresh the spreadsheet to the planning application.

15 Claims, 11 Drawing Sheets

|  | Open | Save | Refresh | Show Tools | Planning  320 Sales Unit Plan ▼ | Mark Selected | Unmark Selected |
|---|---|---|---|---|---|---|---|
|  | A1 ▼ |  | G/L Account |  |  |  |  |

|  | A | B | C | D | E |
|---|---|---|---|---|---|
| 1 | Sales Unit Plan |  |  |  |  |
| 2 |  |  |  |  |  |
| 3 |  |  |  |  |  |
| 4 |  |  | Target |  |  |
| 5 | Sales Unit | Responsible Employee | Jan 2012 | Feb 2012 | Mar 2012 |
| 6 | MC42112 | Bob Menson | $10,000 USD | $10,000 USD | $10,000 USD |
| 7 |  | Kate Jacob | $10,000 USD | $10,000 USD | $10,000 USD |
| 8 |  | Nils Kehres | $15,000 USD | $15,000 USD | $15,000 USD |
| 9 |  | Randal Hagan | $15,000 USD | $15,000 USD | $15,000 USD |
| 10 |  | Susan Ladier | $30,000 USD | $30,000 USD | $30,000 USD |
| 11 |  | Not Assigned | 0 USD | 0 USD | 0 USD |
| 12 |  | Total | $80,000 USD | $80,000 USD | $80,000 USD |
| 13 |  |  |  |  |  |

Plan 2012

| Open | Save | Refresh | Show Tools | Planning<br>Sales Unit Plan ▼ | Mark Selected | Unmark Selected |

| A1 ▼ | G/L Account |

|   | A | B | C | D | E |
|---|---|---|---|---|---|
| 1 | Sales Unit Plan | | | | |
| 2 | | | | | |
| 3 | | | | | |
| 4 | | | Target | | |
| 5 | Sales Unit | Responsible Employee | Jan 2012 | Feb 2012 | Mar 2012 |
| 6 | MC42112 | Bob Menson | $10,000 USD | $12,000 USD | $10,000 USD |
| 7 | | Kate Jacob | $10,000 USD | $10,000 USD | $10,000 USD |
| 8 | | Nils Kehres | $15,000 USD | $15,000 USD | $15,000 USD |
| 9 | | Randal Hagan | $15,000 USD | $15,000 USD | $15,000 USD |
| 10 | | Susan Ladier | $30,000 USD | $30,000 USD | $30,000 USD |
| 11 | | Not Assigned | 0 USD | 0 USD | 0 USD |
| 12 | | Total | $80,000 USD | $80,000 USD | $80,000 USD |
| 13 | | | | | |

Plan 2012

FIG. 4

| | A | B | C | D | E |
|---|---|---|---|---|---|
| 1 | Sales Unit Plan | | | | |
| 2 | | | | | |
| 3 | | | | | |
| 4 | | | Target | | |
| 5 | Sales Unit | Responsible Employee | Jan 2012 | Feb 2012 | Mar 2012 |
| 6 | MC42112 | Bob Menson | $10,000 USD | $12,000 USD | $10,000 USD |
| 7 | | Kate Jacob | $10,000 USD | $2,000 USD | $10,000 USD |
| 8 | | Nils Kehres | $15,000 USD | $16,000 USD | $15,000 USD |
| 9 | | Randal Hagan | $15,000 USD | $15,000 USD | $15,000 USD |
| 10 | | Susan Ladier | $30,000 USD | $30,000 USD | $30,000 USD |
| 11 | | Not Assigned | 0 USD | 0 USD | 0 USD |
| 12 | | Total | $80,000 USD | $80,000 USD | $80,000 USD |
| 13 | | | | | |

| | A | B | C | D | E |
|---|---|---|---|---|---|
| 1 | Sales Unit Plan | | | | |
| 2 | | | | | |
| 3 | | | | | |
| 4 | | | Target | | |
| 5 | Sales Unit | Responsible Employee | Jan 2012 | Feb 2012 | Mar 2012 |
| 6 | MC42112 | Bob Menson | $10,000 USD | $12,000 USD | $10,000 USD |
| 7 | | Kate Jacob | $10,000 USD | $2,000 USD | $10,000 USD |
| 8 | | Nils Kehres | $15,000 USD | $16,000 USD | $15,000 USD |
| 9 | | Randal Hagan | $15,000 USD | $15,000 USD | $15,000 USD |
| 10 | | Susan Ladier | $30,000 USD | $30,000 USD | $30,000 USD |
| 11 | | Not Assigned | 0 USD | 0 USD | 0 USD |
| 12 | | Total | $80,000 USD | $80,000 USD | $80,000 USD |
| 13 | | | | | |

Plan 2012

FIG. 7

| | | | Show | Planning | | Mark | Unmark |
|---|---|---|---|---|---|---|---|
| Open | Save | Refresh | Tools | Sales Unit Plan ▼ | | Selected | Selected |

| A1 ▼ | G/L Account |
|---|---|

| | A | B | C | D | E |
|---|---|---|---|---|---|
| 1 | Sales Unit Plan | | | | |
| 2 | | | | | |
| 3 | | | | | |
| 4 | | | Target | | |
| 5 | Sales Unit | Responsible Employee | Jan 2012 | Feb 2012 | Mar 2012 |
| 6 | MC42112 | Bob Menson | $10,000 USD | $12,000 USD | $10,000 USD |
| 7 | | Kate Jacob | $10,000 USD | $2,000 USD | $10,000 USD |
| 8 | | Nils Kehres | $15,000 USD | $16,000 USD | $15,000 USD |
| 9 | | Randal Hagan | $15,000 USD | $16,667 USD | $15,000 USD |
| 10 | | Susan Ladier | $30,000 USD | $33,333 USD | $30,000 USD |
| 11 | | Not Assigned | 0 USD | 0 USD | 0 USD |
| 12 | | Total | $80,000 USD | $80,000 USD | $80,000 USD |
| 13 | | | | | |

Plan 2012

*FIG. 8*

| | Open | Save | Refresh | Show Tools | Planning<br>Sales Unit Plan ▼ | Mark Selected | Unmark Selected |
|---|---|---|---|---|---|---|---|

| | A1 ▼ | | G/L Account | | |
|---|---|---|---|---|---|
| | A | B | C | D | E |
| 1 | Sales Unit Plan | | | | |
| 2 | | | | | |
| 3 | | | | | |
| 4 | | | Target | | |
| 5 | Sales Unit | Responsible Employee | Jan 2012 | Feb 2012 | Mar 2012 |
| 6 | MC42112 | Bob Menson | $10,000 USD | $12,000 USD | $10,000 USD |
| 7 | | Kate Jacob | $10,000 USD | $2,000 USD | $10,000 USD |
| 8 | | Nils Kehres | $15,000 USD | $16,000 USD | $15,000 USD |
| 9 | | Randal Hagan | $15,000 USD | $15,000 USD | $15,000 USD |
| 10 | | Susan Ladier | $30,000 USD | $30,000 USD | $30,000 USD |
| 11 | | Not Assigned | 0 USD | 0 USD | 0 USD |
| 12 | | Total | $80,000 USD | $80,000 USD | $80,000 USD |
| 13 | | | | | |

Plan 2012

FIG. 9

|   | A | B | C | D | E |
|---|---|---|---|---|---|
| 1 | Sales Unit Plan | | | | |
| 2 | | | | | |
| 3 | | | | | |
| 4 | | | Target | | |
| 5 | Sales Unit | Responsible Employee | Jan 2012 | Feb 2012 | Mar 2012 |
| 6 | MC42112 | Bob Menson | $10,000 USD | $12,000 USD | $10,000 USD |
| 7 | | Kate Jacob | $10,000 USD | $2,000 USD | $10,000 USD |
| 8 | | Nils Kehres | $15,000 USD | $16,500 USD | $15,000 USD |
| 9 | | Randal Hagan | $15,000 USD | $16,500 USD | $15,000 USD |
| 10 | | Susan Ladier | $30,000 USD | $33,000 USD | $30,000 USD |
| 11 | | Not Assigned | 0 USD | 0 USD | 0 USD |
| 12 | | Total | $80,000 USD | $80,000 USD | $80,000 USD |
| 13 | | | | | |

Toolbar: Open | Save | Refresh | Show Tools | Planning: Sales Unit Plan ▼ | Mark Selected | Unmark Selected Cell: A1 ▼ G/L Account Sheet tab: Plan 2012

INPUT TRAIL ON DATA ENTRY

FIELD

Some embodiments relate to planning systems based on business data. More specifically, some embodiments relate to systems to create and modify planning data.

BACKGROUND

The electronic spreadsheet is a primary tool for tracking data and creating data-based plans. For example, a spreadsheet may be used to create a sales plan defining sales targets for one or more sales categories over various time periods. A spreadsheet may provide calculation functions as well, such that changing the value of a sales target for one sales category over one time period automatically changes the total sales target for the sales category over all time periods.

Modern business planning systems may partially or fully pre-populate a plan with values based on stored business data. As described above, a user may then change a value within such a plan. The changed value is then submitted to the planning system, all plan values are recalculated under the assumption that the changed value is fixed, and the recalculated values are displayed. Refreshing the plan after each value is changed may be unsuitably time and resource-consuming, particularly for large plans and/or slow systems. In a case that the user interface is located remotely from the planning system (e.g., a software-as-a-service planning system), the resulting round-trip of plan values may further hamper plan creation Systems may address the foregoing by allowing a user to selectively refresh a plan. Specifically, the user may change any number of values within the plan and choose a "Refresh" user interface control to initiate transmission of the changed values to the planning system for recalculation of the plan values. This procedure presents difficulties because the user may easily lose track of which values have been changed since the last refresh and which values are the most-recently refreshed values. Moreover, neither of the foregoing systems contemplate cell fixation, in which a user desires to fix an unchanged value within the plan so that the value does not change upon refresh, but so that values determined based on the value may change.

Systems are therefore desired to facilitate plan creation.

DETAILED DESCRIPTION

Figure 1:
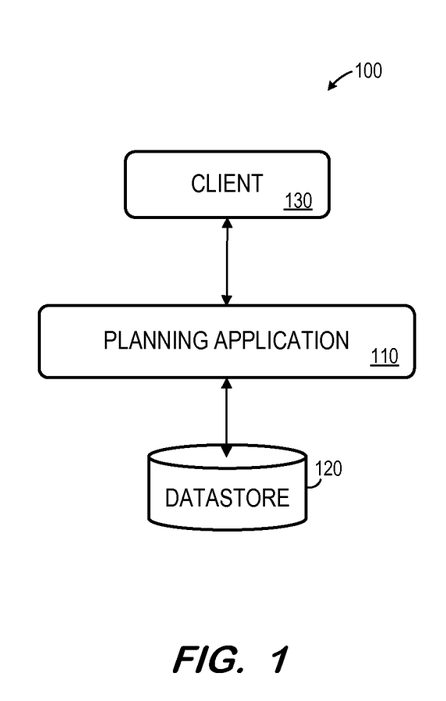
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners.

System 100 includes planning application 110 to provide data of datastore 120 to client 130. For example, client 130 may send a request for a sales plan to planning application 110 and, in response, planning application 110 retrieves the required values from datastore 120, creates a plan including the values and any other values calculated therefrom, and returns the plan to client 130.

Datastore 120 may comprise any one or more systems to store business data. The data stored in datastore 120 may be received from disparate hardware and software systems, some of which are not interoperational with one another. The systems may comprise a back-end data environment employed in a business or industrial context. The data may be pushed to datastore 120 and/or provided in response to queries received therefrom.

The data of datastore 120 may be stored in traditional fixed disks or in-memory (e.g., in Random Access Memory) to allow fast retrieval and processing thereof. The data may comprise a relational database, an in-memory database, a multi-dimensional database, an eXtendable Markup Language (XML) document, and/or any other structured data storage system. The physical tables of datastore 120 may be distributed among several relational databases, dimensional databases, and/or other data sources. To provide economies of scale, datastore 120 may include data of more than one customer. Planning application 110 therefore includes mechanisms to ensure that a client accesses only the data that the client is authorized to access. Moreover, the data of datastore 120 may be indexed and/or selectively replicated in an index.

Client 130 displays user interfaces and data received from planning application 110, and may also be operated to process such data and send data back to planning application 110 for storage in datastore 120. Client 130 may comprise any suitable device, such as a desktop computer, a laptop computer, a personal digital assistant, a tablet PC, and a smartphone. Client 130 may execute program code of a spreadsheet application, a spreadsheet application with a plug-in allowing communication (e.g. via Web Services) with planning application 110, a rich client application, an applet in a Web browser, or any other application to perform the processes attributed thereto herein.

Although system 100 has been described as a distributed system, system 100 may be implemented in some embodiments by a single computing device. For example, both client 130 and planning application 110 may be embodied by a spreadsheet application executed by a processor of a desktop computer, and datastore 120 may be embodied by a fixed disk drive within the desktop computer.

Figure 2:
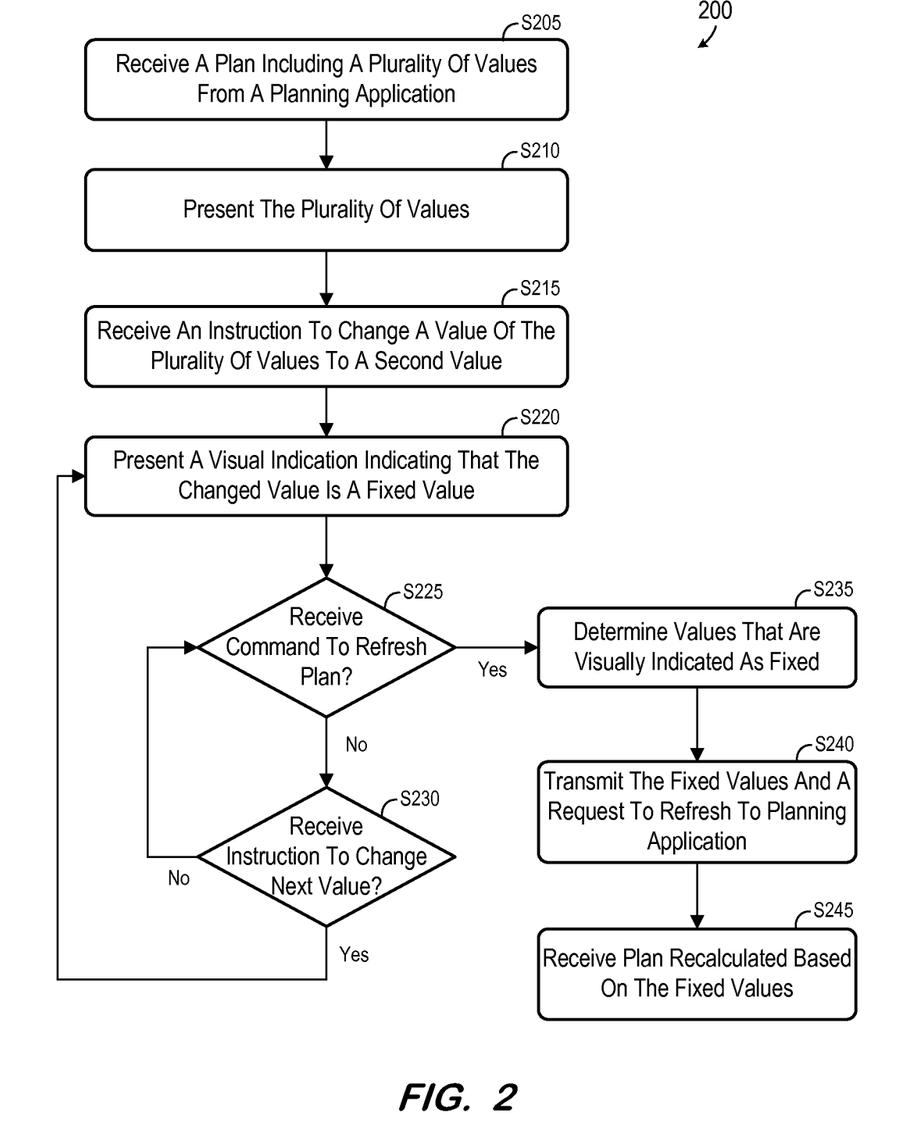
FIG. 2 is a flow diagram of a process according to some embodiments.

FIG. 2 comprises flow diagram of process 200 according to some embodiments. In some embodiments, various hardware elements of system 100 execute program code to perform process 200. In some embodiments, hard-wired circuitry may be used in place of, or in combination with, program code for implementation of processes according to some embodiments. Embodiments are therefore not limited to any specific combination of hardware and software.

Figure 3:
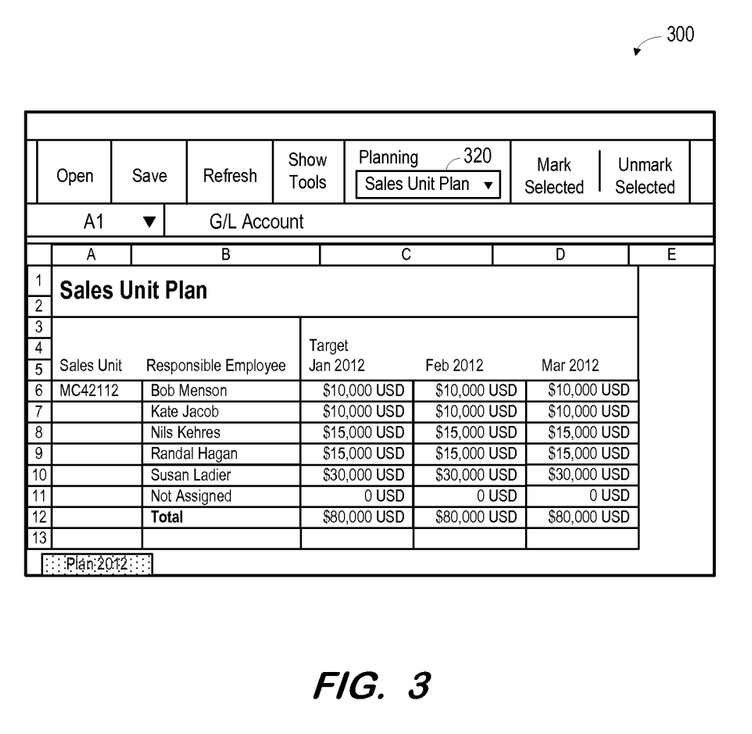
FIG. 3 is a view of a spreadsheet application user interface according to some embodiments.

Prior to S205, client 130 is operated to request a plan from planning application 110. To assist in the present description of an example of process 200, FIG. 3 shows a view of user interface 300 according to some embodiments. User interface 300 may be presented on a display of client 130 in response to execution of a spreadsheet application by a processor of client 130. Alternatively, user interface 300 may be a Web page displayed by a Web browser application executed by the processor. Embodiments are not limited to these examples.

According to the present example, it will be assumed that a user has operated drop-down menu 320 to request a Sales Unit Plan. The request may be received by planning application 110, which, as mentioned above, retrieves required values from datastore 120, and creates a plan including the values and any other values calculated therefrom.

The plan, including the plurality of values, is received from the planning application at S205. Next, at S210, the plurality of values of the plan are presented. Interface 300 shows a portion of such a plan according to some embodiments. In the present example, the first six rows of columns January 2012, February 2012 and March 2012 include values determined by planning application 110 based on values from datastore and on business logic, and the seventh row reflects a column total.

Figure 4:
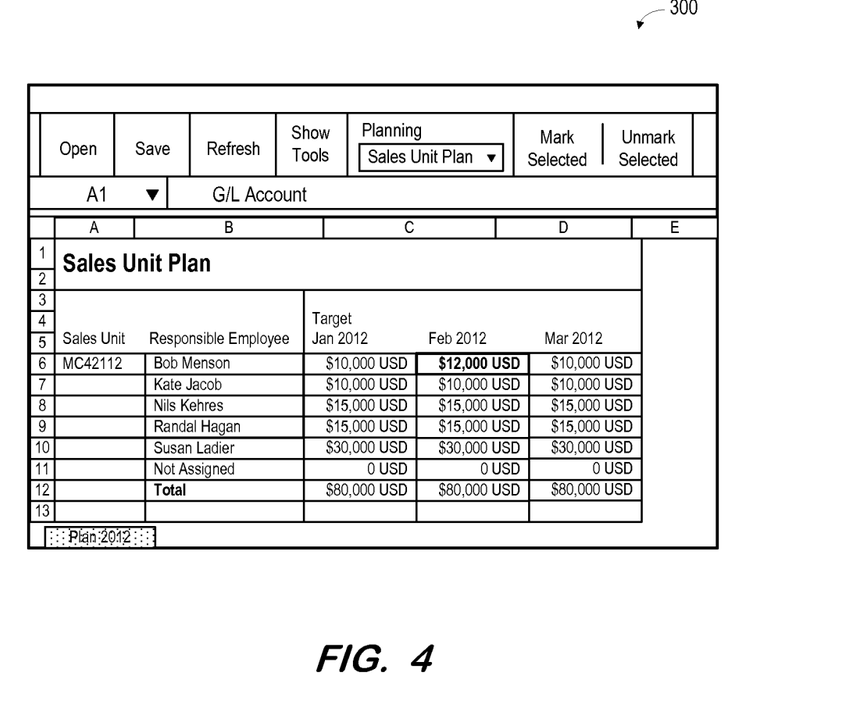
FIG. 4 is a view of a spreadsheet application user interface according to some embodiments.

At S215, an instruction is received to change a value of the plurality of values to a second value. Next, at S220, a visual indication is presented indicating that the changed value is a fixed value. FIG. 4 illustrates interface 300 after S220 according to some embodiments. As shown, the user has changed (e.g., via a keyboard) the value in the first row of the February 2012 column from $10,000 to $12,000. As a result, the new value is presented in bold at S220.

The visual indication (i.e., the bold formatting) indicates that the associated value (i.e., $12,000) is a fixed value. As will be evident from the description below, this designation indicates that the value will be fixed during a next refresh cycle of the plan.

Embodiments may utilize any suitable visual indication at S220. For example, the visual indication may comprise any Style parameter (e.g., color, weight, font, size, etc.) that differs from "unmarked" values. The visual indication may affect the appearance of the cell (e.g., line thickness, background pattern, background color, etc.) containing the value in addition to or instead of the value itself.

At S225, it is determined whether a command has been received to refresh the plan. If not, flow continues to S230 to determine whether an instruction has been received to change a next value in the plan. If not, flow returns to S225. Therefore, flow cycles between S225 and S230 until either a command to refresh the plan or an instruction to change a next value are received.

Figure 5:
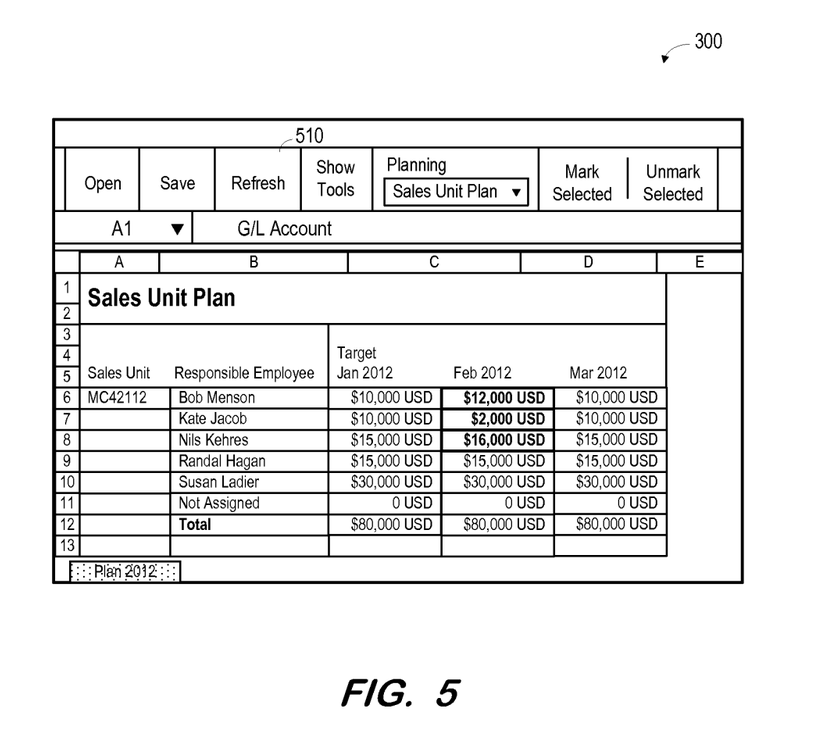
FIG. 5 is a view of a spreadsheet application user interface according to some embodiments.

For purposes of the present example, it will be assumed that the user changes two more values within user interface 300. Accordingly, flow returns to S220 twice to present visual indications indicating that the changed values are fixed values. FIG. 5 illustrates this example, in which the values of the second and third rows of the February 2012 column have been changed to $2,000 and $16,000, respectively. Next, it is assumed that the user selects Refresh control 510, thereby causing flow to proceed from S225 to S235.

At S235, the values which are visually indicated as fixed are determined. These values are transmitted to the planning application at S240, along with a request to refresh the plan. In response, the planning application recalculates the plan under the assumption that the determined values are fixed. The recalculated plan is received at S245.

Figure 6:
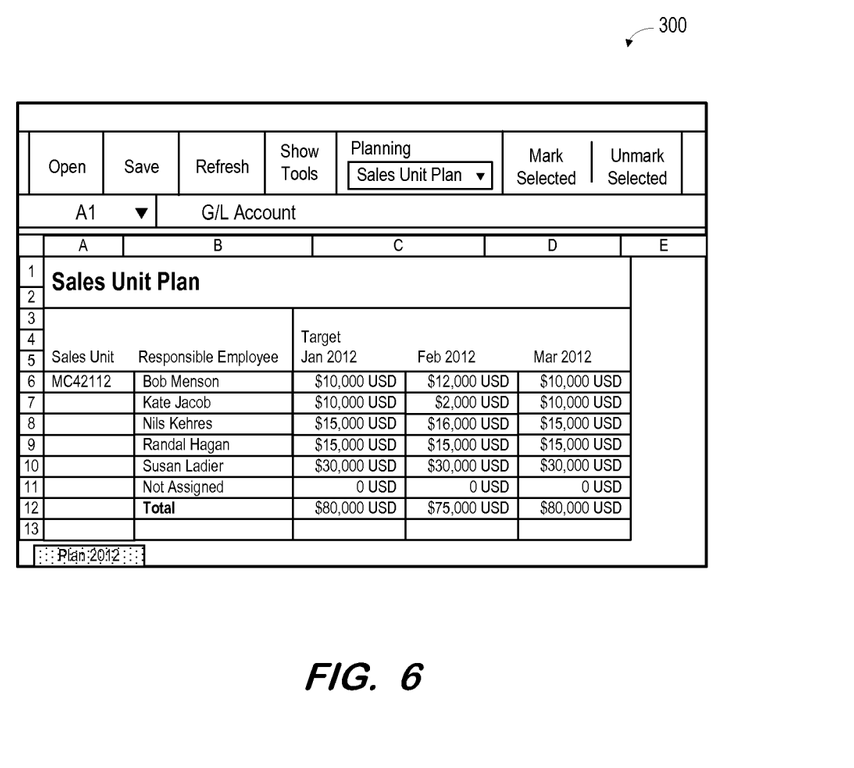
FIG. 6 is a view of a spreadsheet application user interface according to some embodiments.

FIG. 6 illustrates a recalculated plan according to the present example. As shown, the value of the Total row for the February 2012 column has been recalculated to reflect the fixed values. Advantageously, some embodiments of process 200 therefore allow a user to easily determine multiple values that will be fixed upon refresh of a plan, while avoiding a refresh upon each value change.

Figure 7:
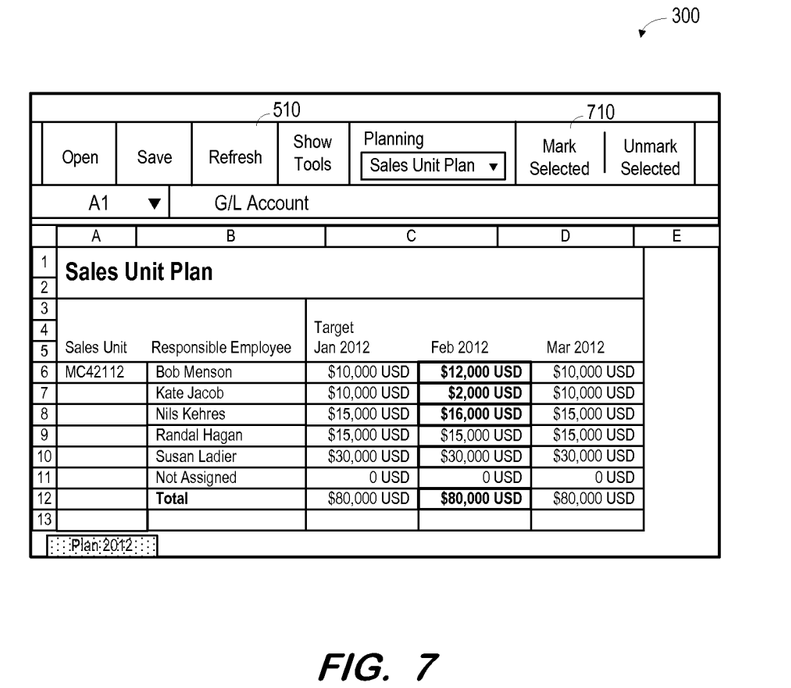
FIG. 7 is a view of a spreadsheet application user interface according to some embodiments.

According to some embodiments, a user may also selectively mark plan values with a visual indication as described above, even if the value has not been changed. FIG. 7 continues the example of FIG. 5, albeit in which the Total row of the February 2012 column has been visually indicated as fixed. More particularly, the user has selected the corresponding cell (e.g., using a mouse pointer) and then selected Mark Selected control 710. As a result, the value is associated with a visual indication indicating that the value is fixed.

Figure 8:
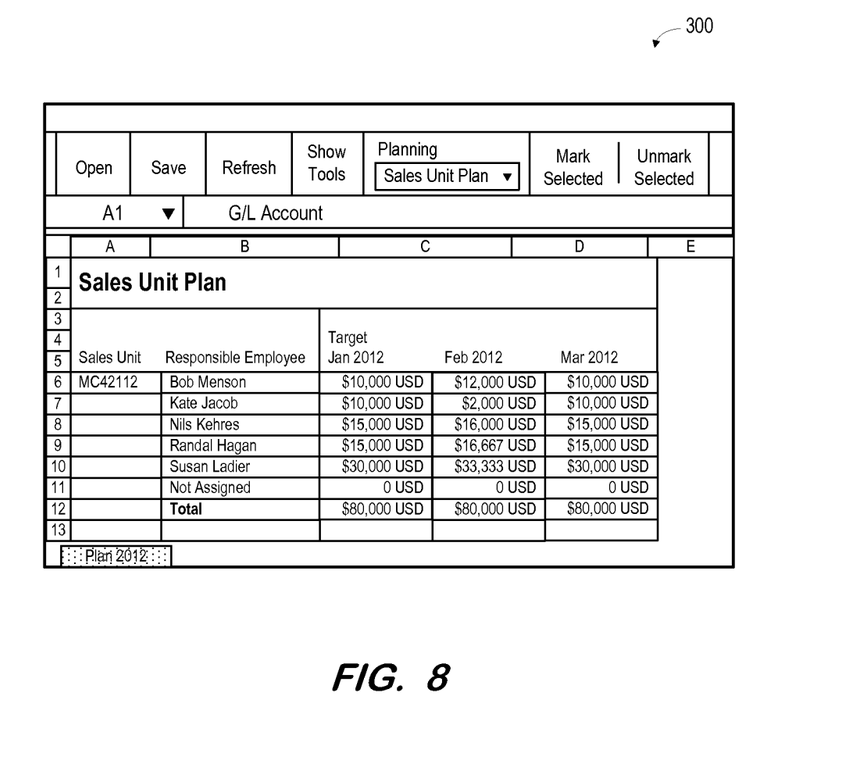
FIG. 8 is a view of a spreadsheet application user interface according to some embodiments.

Upon subsequent selection of Refresh control 510, flow may proceed as described above with respect to S235 through S245. A resulting recalculated and received plan is shown in FIG. 8. According to the example, the values of the fourth and fifth rows of the February 2012 column have been updated based on the values that were indicated as fixed in FIG. 7. Some embodiments may therefore facilitate cell fixation at multiple levels of aggregation.

Figure 9:
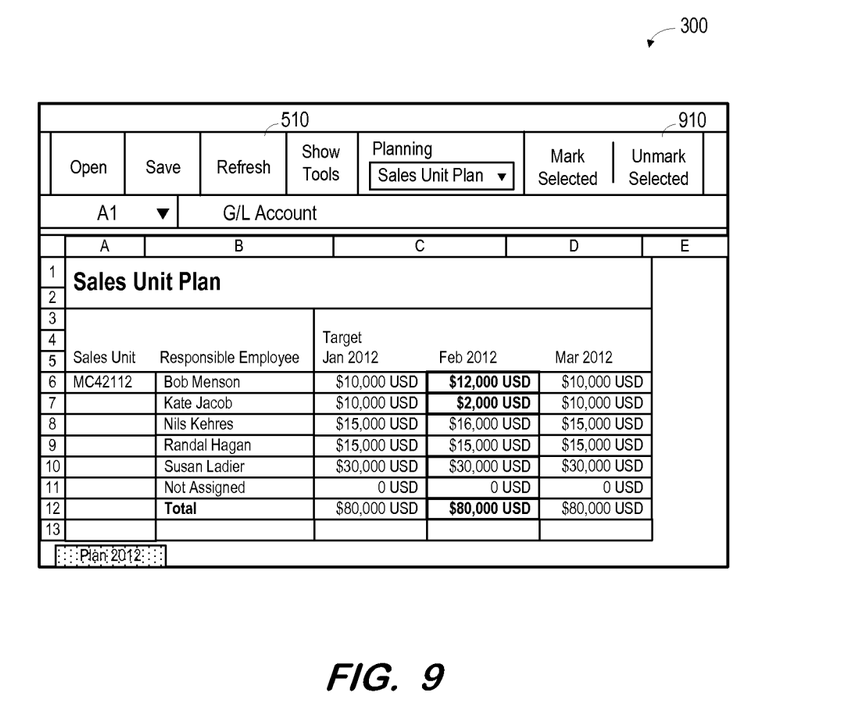
FIG. 9 is a view of a spreadsheet application user interface according to some embodiments.

Some embodiments may also or alternatively provide for removal of visual indications as described herein. FIG. 9 continues the example of FIG. 7, in which the third row of the February 2012 column, whose value was previously changed from $15,000 to $16,000, is no longer associated with a visual indication. For example, the user has selected the corresponding cell (e.g., using a mouse pointer) and then selected Unmark Selected control 910.

Figure 10:
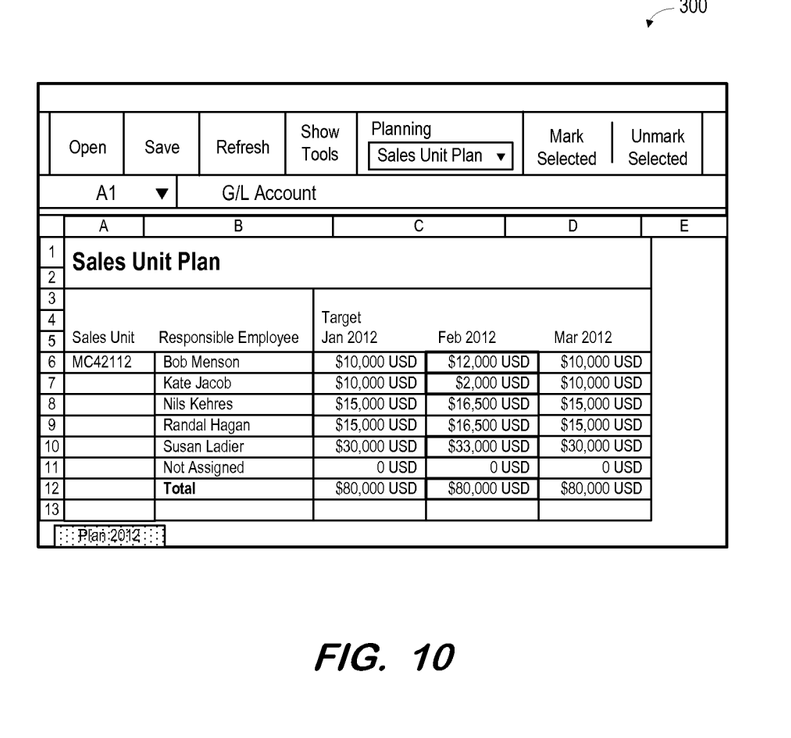
FIG. 10 is a view of a spreadsheet application user interface according to some embodiments.

Next, the user selects Refresh control 510, and flow proceeds as described above to identify only the marked cells at S235 and to transmit the corresponding values to the planning system at S240. The plan is recalculated and received at S245. FIG. 10 illustrates the recalculated plan according to one example, in which the values of the third through fifth rows of the February 2012 column have been updated based on the values that were indicated as fixed in FIG. 9. Notably, the value of the third row has been updated although it was previously changed by the user.

Figure 11:
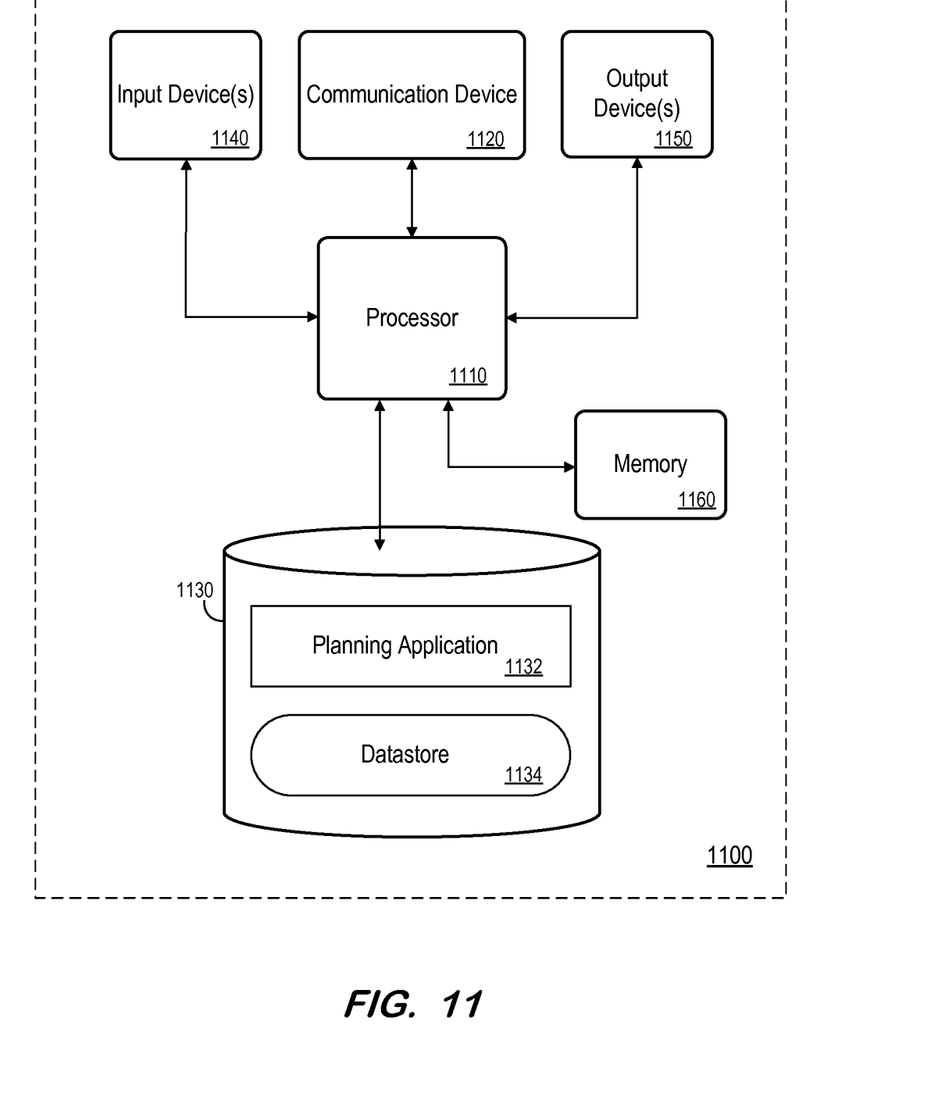
FIG. 11 is a block diagram of a computing device according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of one or more elements of system 100. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices, such as an external design tool. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Planning application 1132 of data storage device 1130 may comprise program code executable by processor 1110 to provide any of the functions described herein. Embodiments are not limited to execution of these functions by a single apparatus. Datastore 1134 may include data as described herein with respect to datastore 120. As also mentioned herein, memory 1160 may also or alternatively store data of datastore 120, with datastore 1134 providing a persistent backup. Data storage device 1130 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, the method comprising:
    receiving, from a planning application, a spreadsheet including a plurality of values;
    presenting the plurality of values;
    receiving a first instruction to change a first value of the plurality of values to a second value;
    in response to the first instruction, presenting a first visual indication in association with the second value, the first visual indication indicating that the second value will be fixed in a next recalculation of the spreadsheet;
    receiving a second instruction to fix a third value of the first plurality of values in the next recalculation of the spreadsheet;
    in response to the second instruction, presenting a second visual indication in association with the third value, the second visual indication indicating that the third value will be fixed in the next recalculation of the spreadsheet;
    receiving a third instruction to refresh the spreadsheet; and
    in response to the third instruction,
    transmitting, to the planning application, a request to recalculate the spreadsheet with the second value and the third value being fixed.

2. A method according to claim 1, further comprising:
    receiving a fourth instruction to change a fourth value of the plurality of values to a fifth value;
    in response to the fourth instruction, presenting a third visual indication indicating that the fifth value will be fixed in the next recalculation of the spreadsheet,
    wherein the request comprises a request to recalculate the spreadsheet with the second value, the third value and the fifth value being fixed.

3. A method according to claim 2, further comprising:
    receiving, from the planning application and in response to the request, a second spreadsheet including a second plurality of values,
    wherein the second plurality of values comprise the second value, the third value and the fifth value, and
    wherein at least one of the second plurality of values is different from a respective one of the plurality of values.

4. A method according to claim 1, further comprising:
    receiving a fourth instruction to change a fourth value of the plurality of values to a fifth value;
    in response to the fourth instruction, presenting a third visual indication indicating that the fifth value will be fixed in the next recalculation of the spreadsheet; and
    receiving a fifth instruction to remove the third visual indication indicating that the fifth value will be fixed in the next recalculation of the spreadsheet,
    wherein the request does not comprise a request to recalculate the spreadsheet with the fifth value being fixed.

5. A method according to claim 1, further comprising:
    receiving, from the planning application and in response to the request, a second spreadsheet including a second plurality of values,
    wherein the second plurality of values comprise the second value and the third value, and
    wherein at least one of the second plurality of values is different from a respective one of the plurality of values.

6. A non-transitory medium storing processor-executable program code, the program code executable by a device to:
    receive, from a planning application, a spreadsheet including a plurality of values;
    present the plurality of values;
    receive a first instruction to change a first value of the plurality of values to a second value;
    in response to the first instruction, present a first visual indication in association with the second value, the first visual indication indicating that the second value will be fixed in a next recalculation of the spreadsheet;
    receive a second instruction to fix a third value of the plurality of values in the next recalculation of the spreadsheet;
    in response to the second instruction, present a second visual indication in association with the third value, the second visual indication indicating that the third value will be fixed in the next recalculation of the spreadsheet;
    receive a third instruction to refresh the spreadsheet; and
    in response to the third instruction:
        transmit, to the planning application, request to recalculate the spreadsheet with the second value and the third value being fixed.

7. A medium according to claim 6, the program code further executable by a device to:
    receive a fourth instruction to change a fourth value of the plurality of values to a fifth value; and
    present, in response to the fourth instruction, a third visual indication indicating that the fifth value will be fixed in the next recalculation of the spreadsheet, wherein the request comprises a request to recalculate the spreadsheet with the second value, the third value and the fifth value being fixed.

8. A medium according to claim 7, the program code further executable by a device to:
receive, from the planning application and in response to the request, a second spreadsheet including a second plurality of values,
wherein the second plurality of values comprise the second value, the third value and the fifth value, and
wherein at least one of the second plurality of values is different from a respective one of the plurality of values.

9. A medium according to claim 6, the program code further executable by a device to:
receive a fourth instruction to change a fourth value of the plurality of values to a fifth value;
present, in response to the fourth instruction, a third visual indication indicating that the fifth value will be fixed in the next recalculation of the spreadsheet; and
receive a fifth instruction to remove the third visual indication indicating that the fifth value will be fixed in the next recalculation of the spreadsheet,
wherein the request does not comprise a request to recalculate the spreadsheet with the fifth value being fixed .

10. A medium according to claim 6, the program code further executable by a device to:
receive, from the planning application and in response to the request, a second spreadsheet including a second plurality of values,
wherein the second plurality of values comprise the second value and he third value, and
wherein at least one of the second plurality of values is different from a respective one of the plurality of values.

11. A system comprising:
a computing device comprising:
a memory storing processor-executable program code; and
a processor to execute the processor-executable program code in order to cause the computing device to:
receive, from a planning application, a spreadsheet including a plurality of values;
present the plurality of values;
receive a first instruction to change a first value of the plurality of values to a second value;
in response to the first instruction, present a first visual indication in association with the second value, the first visual indication indicating that the second value will be fixed in a next recalculation of the spreadsheet;
receive a second instruction to fix a third value of the plurality of values in the next recalculation of the spreadsheet;
in response to the second instruction, present a second visual indication in association with the third value, the second visual indication indicating that the third value will be fixed in the next recalculation of the spreadsheet;
receive a third instruction to refresh the spreadsheet; and
in response to the third instruction,
transmit, to the planning application, a request to recalculate the spreadsheet with the second value and the third value being fixed.

12. A system according to claim 11, the processor to further execute the processor-executable program code in order to cause the computing device to:
receive a fourth instruction to change a fourth value of the plurality of values to a fifth value;
present, in response to the fourth instruction, a third visual indication indicating that the fifth value will be fixed in the next recalculation of the spreadsheet,
wherein the request comprises a request to recalculate the spreadsheet with the second value, the third value and the fifth value being fixed.

13. A system according to claim 12, the processor to further execute the processor-executable program code in order to cause the computing device to:
receive, from the planning application and in response to the request, a second spreadsheet including a second plurality of values,
wherein the second plurality of values comprise the second value, the third value and the fifth value, and
wherein at least one of the second plurality of values is different from a respective one of the plurality of values.

14. A system according to claim 11, the processor to further execute the processor-executable program code in order to cause the computing device to:
receive a fourth instruction to change a fourth value of the plurality of values to a fifth value;
present, in response to the fourth instruction, a third visual indication indicating that the fifth value will be fixed in the next recalculation of the spreadsheet; and
receive a fifth instruction to remove the third visual indication indicating that the fifth value will be fixed in the next recalculation of the spreadsheet,
wherein the request does not comprise a request to recalculate the spreadsheet with the fifth value being fixed.

15. A system according to claim 11, the processor to further execute the processor-executable program code in order to cause the computing device to:
receive, from the planning application and in response to the request, a second spreadsheet including a second plurality of values,
wherein the second plurality of values comprise the second value and the third value, and
wherein at least one of the second plurality of values is different from a respective one of the plurality of values.

* * * * *